Mar. 13, 1923.  1,448,686

F. J. DRUAR

SPRING SHACKLE OR THE LIKE

Filed Apr. 9, 1919

Inventor;
Frank J. Druar,
By Milton Tibbetts
Atty.

Patented Mar. 13, 1923.

1,448,686

UNITED STATES PATENT OFFICE.

FRANK J. DRUAR, OF DETROIT, MICHIGAN, ASSIGNOR TO PACKARD MOTOR CAR COMPANY, OF DETROIT, MICHIGAN, A CORPORATION OF MICHIGAN.

SPRING SHACKLE OR THE LIKE.

Application filed April 9, 1919. Serial No. 288,672.

*To all whom it may concern:*

Be it known that I, FRANK J. DRUAR, a citizen of the United States, and resident of Detroit, Wayne County, State of Michigan, have invented certain new and useful Improvements in Spring Shackles or the like, of which the following is a specification.

This invention relates to spring shackles or the like for motor vehicles.

One object of the invention is to provide a spring shackle which shall have means of a simple construction capable of being readily applied to the bolt of the shackle for distributing lubricant to the radially extended bearing surfaces between the shackle and the relatively movable part to which it may be connected such as the spring eye or the frame.

Another object of the invention is to provide a packing of a form which renders it capable of being securely retained in its seat, for preventing the escape of oil from the joint around the said lubricant feeding means.

Another object of the invention is to provide bushings between the bolt and the part adapted to be connected thereto, which shall be capable of ready insertion and removal.

Another object of the invention is to provide a construction in which the bolt itself is provided with a retaining groove for the packing which is adapted to close the joint between the spring eye or parts associated therewith and the other relatively pivoted part, whereby facility in manufacture of the packing retaining means is obtained, and whereby it is rendered possible to draw the packing into close contact with the opposing surfaces of the parts whose joint it is desired to close.

With these objects and others in view, the invention is embodied in preferable form in the construction and arrangement hereinafter described and illustrated in the accompanying drawings; in which—

Figure 1:
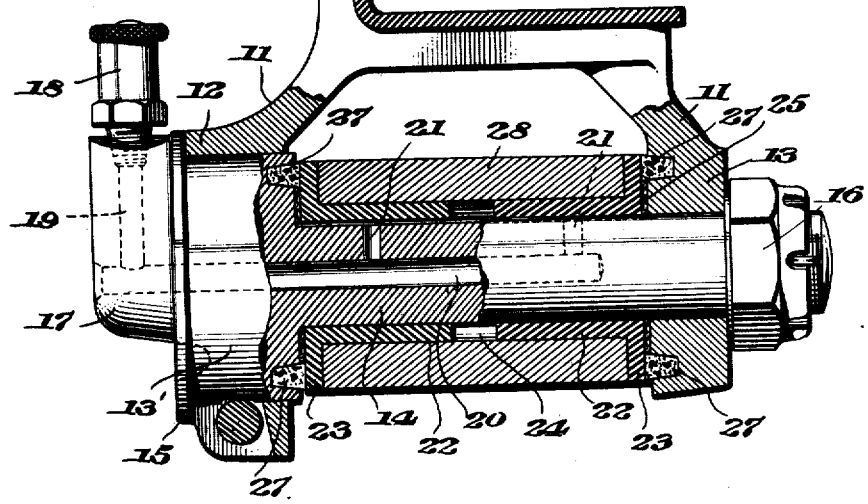
Fig. 1 is a vertical section, partly in elevation, showing the invention applied embodied in a construction capable of application to either a shackle used at the front end of the rear spring of a motor vehicle or one employed at the front end of the front spring.

Referring to the drawings, 10 indicates a hanger depending from the frame of a motor vehicle and connected to arms 11 of a spring shackle. These arms are provided with annular heads 12 and 13 of which the former is adapted to fit upon and be clamped against the enlarged circular head 13' of a bolt 14 which is provided with an outer flange 15 adapted to bear against the outer edge of the head 12. The bolt extends through the shackle and at its opposite end is provided with a nut 16 adapted to bear against the outer surface of the head 13 whereby upon tightening the nut the two arms of the shackle are drawn toward one another. The bolt is prolonged outwardly beyond the flange 15 to provide a boss 17 which is channeled horizontally and vertically to provide oil passages and which receives an oil cup 18 adapted to supply suitable lubricant to the interior of the bolt. 19 is a vertical oil feeding passage and 20 is the horizontal channel communicating therewith. The channel 20 has branches 21 leading to the exterior of the bolt for the purpose of supplying lubricant to the bearing surfaces of said bolt and a part surrounding the same.

Mounted on the bolt are two annular bushings 22 each provided at its outer end with a radially extending flange 23 adapted to provide an opposing surface to the corresponding radial surface of one of the bolt heads. These bushings are spaced centrally of the bolt at 24. Owing to the fact that this bushing construction is made in two parts, the members thereof may be readily applied to the bolt by slipping the same thereon from opposite ends of the bolt.

Mounted on the bolt between the flange 23 and the head of the shackle arm at the corresponding end of the shackle is an annular lubricant retaining and feeding member consisting preferably of a disk 25 having perforations 26 extending therethrough. These openings are adapted to be filled with a suitable lubricating material capable of being retained therein, and such material is preferably graphite, although possibly other non-fluid lubricant may be utilized. The longitudinal bearing surfaces between the shackle and the bushings are adapted to be lubricated by oil supplied through the bolt channels while the radial surfaces which are subject to wear are supplied with lubricant through the said retaining members 25. The joint between said disk 25 and the adjoining flange and head of the bushing and shackle respectively, is adapted to be closed by an annular flexible packing 27 which is preferably of cork, and which is made wedge-shape axially of the bolt in order to provide a simple mode of securing the packing within the head of the shackle.

Mounted between the end flanges of the two bushings is a spring eye 28 forming the end of a leaf spring of usual construction (not herein shown). Considered with relation to the essential features of the invention, of course, instead of the spring eye, some other part to be pivotally connected such as the end of a frame member, may take the place of said spring eye, and in the lower half of the construction illustrated in Fig. 2 the part pivotally movable with respect to the shackle consists of a sleeve or eye of a frame member.

The enlarged radial head 13 at one end of the bolt provides a radially extending portion adapted to oppose the radial flange of the adjacent bushing thus enabling the retaining groove for the packing to be more readily formed than would be the case with a groove provided in the bracket arm of the shackle itself, and at the same time such construction obtains a direct bearing on the bolt against the packing so as to enable the latter to be readily pressed into close contact with the flanges of the spring bushings and enabling adjustment to be made for end wear on these bushings.

Figure 2:
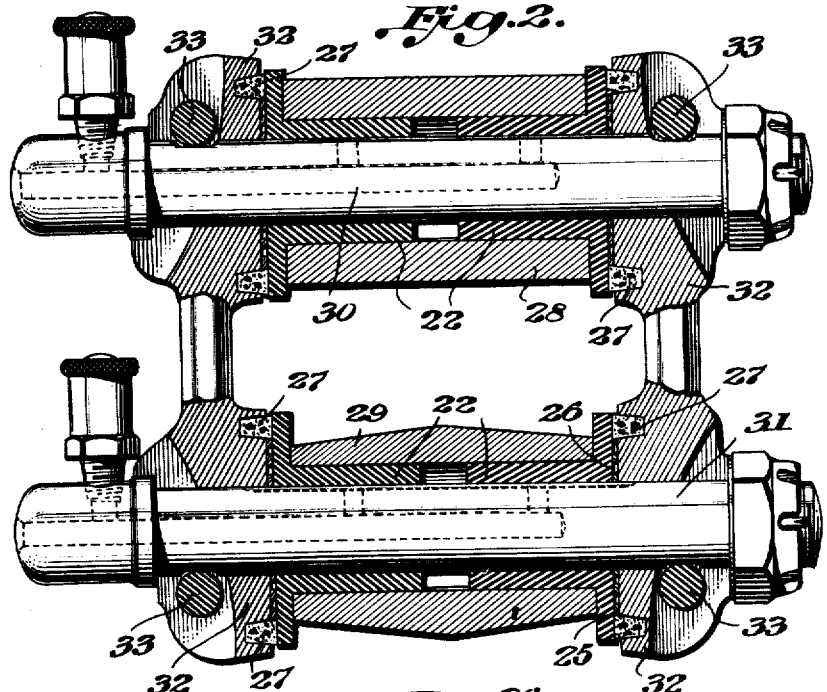
Fig. 2 is a similar view showing the invention applied to a shackle employed at the rear end of the rear spring.
Figure 3:
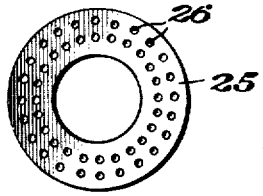
Fig. 3 is a detail side view of the lubricant retaining and feeding means constituting an important element of the invention.

In Fig. 2 the same construction of lubricant retainer, packing, bushings and oil feeding means is provided as described with reference to Fig. 1 and hence in such figure the same reference numerals as used in Fig. 1 are supplied to corresponding parts. In this arrangement, the lower part of the shackle is adapted to receive the turned end or eye 29 of a frame member. In this arrangement also, the two bolts employed are of different construction from that illustrated in Fig. 1. The bolts 30 and 31 in Figure 2, are of substantially continuous cylindrical form and all of the heads 32 of the shackle arms engaged by said bolts are split and provided with tightening screws 33.

Having thus described my invention what I claim and desire to secure by Letters Patent is:—

1. In combination with a spring shackle, a part pivotally connected thereto, means for feeding lubricant to the longitudinal bearing surfaces of said parts, and a member extended radially with respect to the pivot and having means to retain and feed lubricant to the radially projected surfaces of said parts.

2. In combination with a spring shackle, a bolt, a part pivotally connected to the shackle through said bolt, a bushing surrounding the bolt, means to feed lubricant to the bearing surfaces of said bolt and bushing, said bushing and shackle having radially extended ends and a perforated lubricant carrying washer interposed between the bearing surfaces of said ends and bushings.

3. In combination with a spring shackle, a part pivotally connected thereto, and an annular wedge-shaped packing of flexible material seated in one of said parts.

4. In combination with a spring shackle, a part pivotally connected thereto, means for lubricating the longitudinal bearing surfaces of said parts, a perforate annular lubricant carrying washer for lubricating radially extending surfaces of said parts and a packing of flexible material annularly enclosing said washer.

5. In combination with a spring shackle, a part pivotally connected thereto, a bolt, separate bushings between said bolt and part, each bushing having a radially extending bearing flange and lubricating means between said flanges and said shackle.

6. In combination with a spring shackle, a part pivotally connected thereto, a connecting bolt, bushings between said bolt and shackle spaced apart at their inner ends and having flanged outer ends taking over the ends of said pivoted part, a lubricant carrying perforate washer interposed between each of said flanges and said shackle and an annular packing member surrounding and enclosing said washer.

7. In combination with a spring shackle, a part pivotally connected thereto, a connecting bolt for said parts, said bolt having an enlarged head at one end thereof extending over the end of said pivotally connected part, a lubricant retaining member mounted adjacent the radial surface of said head, and a packing mounted in said head beyond the outer edge of the said lubricant retaining member.

8. In combination with a spring shackle, a bolt, a spring eye, a bushing having a radial flange at one end thereof and interposed between said spring eye and the bolt, said bolt having an enlarged radial head at one end thereof opposing said flange of the bushing, a lubricant carrying annular member surrounding the bolt between said head and flange and a packing of flexible material mounted in the head beyond said member and bearing against said flange.

9. In combination with a spring shackle, a spring eye, a connecting bolt, having an enlarged radial head, an opposing part having a similar radial portion forming a joint between them and a flexible packing bearing directly against said opposed radial surfaces of the relative parts.

10. In combination with a spring shackle, a spring eye, a connecting bolt, a radially enlarged head on said bolt on one end thereof having a flat bearing surface, an opposing radial part having a corresponding flat bearing surface, an annular groove formed in said radial part of said head and a flexible annular packing seated in said groove and having a bearing against said opposing part, to close the joint between the same and the head.

11. In combination with a spring shackle, a spring eye, a connecting bolt, said bolt having a radially enlarged head, a bushing between said eye and bolt having a radial flange opposing said radial head of the bolt, said head having an annular groove therein and a flexible annular packing seated in said groove and bearing on said flange.

12. In combination with a spring shackle, a spring eye, a connecting bolt, having a radially enlarged head at one end, a washer between said eye and bolt having a radial flange opposing said radial head and forming a joint between said parts, said head having an annular groove and an annular cork packing seated in said groove and bearing against said bushing flange to close the joint between said flange and head.

In testimony whereof I affix my signature.

FRANK J. DRUAR.